United States Patent [19]

Rockwood

[11] Patent Number: 4,625,289

[45] Date of Patent: Nov. 25, 1986

[54] COMPUTER GRAPHICS SYSTEM OF GENERAL SURFACE RENDERING BY EXHAUSTIVE SAMPLING

[75] Inventor: Alyn P. Rockwood, Centerville, Utah

[73] Assignee: Evans & Sutherland Computer Corp., Salt Lake City, Utah

[21] Appl. No.: 690,553

[22] Filed: Jan. 9, 1985

[51] Int. Cl.$^4$ ............................................. G06F 15/68
[52] U.S. Cl. .................................... 364/522; 364/518; 382/41
[58] Field of Search ....................... 364/518, 521, 522; 382/41

[56] References Cited

U.S. PATENT DOCUMENTS

| | | | |
|---|---|---|---|
| 3,816,726 | 6/1974 | Sutherland et al. | 364/518 X |
| 3,889,107 | 6/1975 | Sutherland | 364/518 X |
| 4,570,233 | 2/1986 | Yan et al. | 364/522 |

*Primary Examiner*—Michael L. Gellner
*Attorney, Agent, or Firm*—Nilsson, Robbins, Dalgarn, Berliner, Carson & Wurst

[57] ABSTRACT

A z-buffer technique of exhaustive sampling is disclosed for rendering general surfaces in a computer graphics system. The system avoids the need for surface normal calculations or the computation of surface intersections with either ray or plane. It employs a dense surface scan of the object, which produces sample points on the surface. The samples thus obtained are passed through viewing transformations and then sorted into a z-buffer. The z-buffer retains the nearest sample to the viewer for each pixel, recording its x, y and z co-ordinates in object space. The surface normal at each pixel is estimated by comparison of neighboring entries and the corresponding intensity value is computed according to a standard illumination model.

As disclosed, the system is applicable to a wide variety of surface types, e.g. parametric, implicit and procedurally defined surfaces; and to a wide variety of display styles such as shadowing, texturing and hidden-line.

11 Claims, 5 Drawing Figures

COMPUTER GRAPHICS SYSTEM OF GENERAL SURFACE RENDERING BY EXHAUSTIVE SAMPLING

BACKGROUND AND SUMMARY OF THE INVENTION

In recent years, substantial progress has been made in the art of computer graphics. However, certain problems have endured, as the hidden line or surface problem. The hidden surface/line problem consists of removing those parts of a computer generated image which are hidden from a given viewpoint because they are occluded by other objects in the scene. At least one technical commentator describes the problem as one of the most enduring in computer graphics. Still, it is an intrinsic part of any non-trivial rendering scheme in the computer generation of pictures.

The hidden surface problem is treated in some detail in U.S. Pat. No. 3,889,107, System of Polygon Sorting by Dissection issued to Ivan E. Sutherland. Somewhat related to the above patent, it is generally recognized that the hidden line/surface problem is essentially a reformulation of the sorting problem—in x, y and z. Most algorithms address the problem by restricting the object type displayed, thus many deal only with planar facets, which can be employed to give a piecewise linear approximation to more complex assemblies. This has the advantage that features of the plane can be used to accelerate the sorting. The most widely known viewing algorithms sort planar polygons, using knowledge of the structure to reduce what would ordinarily be an n-squared problem to an n times log(n) problem.

A system implementing one algorithm, the so-called z-buffer algorithm, is disclosed in the Proceedings of the Conference on Computer Graphics, Pattern Recognition and Data Structure, 1975 IEEE, New York, "Computer Display of Curved Surfaces" by E. E. Catmull. The z-buffer system sorts in linear time. This method maps a surface through the viewing transformations into its screen coordinates. The z coordinate values associated with given x and y values in screen coordinates are then sorted by a simple exchange so that the current z is the one nearest the viewer. The pre-images of the sorted values are used along with the corresponding surface normals to determine the picture element intensity at (x,y) in screen space. Generally, the system of the present invention, the techniques of which might be collectively referred to as exhaustive sampling, involves z-buffer techniques. In that regard, two observations about z-buffers are useful to note specifically:

1. The z-buffer achieves efficient sorting at the expense of z value calculations. The more complex the surface is, the more difficult it is to determine all possible z values for given values of x and y. As before, many versions require the surface to be faceted since it is easier to solve for z on planar surfaces. More general techniques must solve roots of high order equations.

2. Finding the normal to the surface for all points which emerge from the sort can also be costly. The normal is needed for the illumination effects if the surface is to be rendered by a shading technique. The faceted surface approximation has the ostensible advantage here, but in order to do a reasonable job of faceting non-planar surfaces, knowledge of the surface curvature is needed. Both methods, therefore, require finding derivatives of the surface. Depending on the surface this can be expensive.

In general, the system of the present invention is directed to an improved form of z-buffer, specifically with regard to the above observations.

Much of the recent research in image rendering techniques has dealt with very general surfaces. Particular attention has been paid to parametrically defined polynomial surfaces and recently, more general surfaces. Exhaustive sampling techniques in accordance herewith are applicable to these and other very general surface types; and to a variety of display styles, for example, hidden-line, half-tone, cast shadows, texturing, and so on.

The techniques of the present system have some affinity to a rudimentary program for small computing facilities. Specifically, see "An Inexpensive Technique for Displaying Algebraically Defined Surfaces", Graphics Techniques in Geometry and Topology, Notices of Amer. Math. Soc., Evanston, Ill., Apr. 1977, by A. Rockwood and R. P. Burton. Subsequently, a similar routine was developed and that has been documented to render fractal surfaces. See "Dial: A Diagrammatic Animation Language", IEEE Computer Graphics and Applications, Vol. 2, No. 7, Sept. 1982, by S. Feiner, P. Salesin, and T. Banchoff. These techniques, however, apparently have not had a serious exposition per se. Reasons for this benign neglect are probably apparent algorithmic inconsistencies. Exhaustive sampling in accordance herewith is subtle in that it works well in spite of some ostensible problems.

Some analytical considerations will be helpful in understanding the system of the present invention. In that regard, there is only one requirement for a surface to be displayable by the present technique of exhaustive sampling; namely, a function or procedure must exist which produces a dense (exhausted) scan of sample points on the entire surface.

Let $E_S = (x_i, y_i, z_i)$, $i = 1, 2, \ldots N$ be a set of points on the surface S. If for every point of S there is a point of $E_S$ within a distance r, then $E_S$ is said to exhaust the surface S to resolution r.

Let T be the transformation which maps a point from object space to screen space. T may typically be a composition of translation, rotation, scaling and perspective transformations; and let the points (XMAX,YMAX) and (XMIN,YMIN) define the corners of the viewing window. Let NUMX and NUMY be the number of desired pixels in the respective x and y directions.

For any (x,y,z) in $E_S$, let $(X,Y,Z) = T(x,y,z)$, let
  $I = \text{integer}((X - XMIN)/(XMAX - XMIN)) \cdot NUMX$ and let
  $J = \text{integer}((Y - YMIN)/(YMAX - YMIN)) \cdot NUMY$, where I and J are indices for the z-buffer array ZBUF(1 ... 3, 1 ... NUMX, 1 ... NUMY). If ZBUF(3,I,J) is empty or if ZBUF(3,I,J) < Z then, let (ZBUF(1,I,J), ZBUF(2,I,J), ZBUF(3,I,J)) = (x,y,z), otherwise make no change. Continue this for every point in $E_S$.

The parameter r must be chosen so that there are enough samples to saturate the z-buffer. This will depend very much on the surface rendered.

Once the z-buffer is created the surface normal approximation can be constructed for all but the last column and last row by computing the cross product of the vector difference between the ZBUF points at (I,J) and (I+1,J) and the vector difference between the ZBUF points at (I,J) and (I,J+1).

To conceptualize the system, imagine a dense set of points on the surface. Each point is mapped into screen space and sorted into the appropriate pixel "bin" on the basis of x and y coordinates. Only the point (x,y,z) with the largest z value is kept in the bin, effectively eliminating the hidden surface. That is, only the data for points nearest the viewer are kept. The cloud of points must be dense enough to saturate all bins which correspond to the surface.

Once the "binning" is accomplished then the surface normal at each point is estimated, as indicated, for forming vectors from the point to neighboring points and computing an approximation to the surface normal from their cross product. The neighbors can be picked arbitrarily as long as the derived vectors are not co-linear.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENTS

As required, detailed illustrative embodiments of the invention are disclosed herein. The embodiments merely exemplify the invention which may, of course, be constructed in various other forms, some of which may be quite different from the disclosed illustrative embodiments. However, specific structural and functional details disclosed herein are merely representative and in that regard provide a basis for the claims herein which define the scope of the present invention.

As disclosed in detail herein, the system of the present invention is useful in various applications to process geometric data, e.g. data representative of objects. Recognizing that the objects represented are to be moved within a field of vision so that different views are presented, the system of the present invention may be employed variously to effectively process the data representing the surfaces for actuating a display apparatus to accomplish desired display as on a two-dimensional screen.

Figure 1:
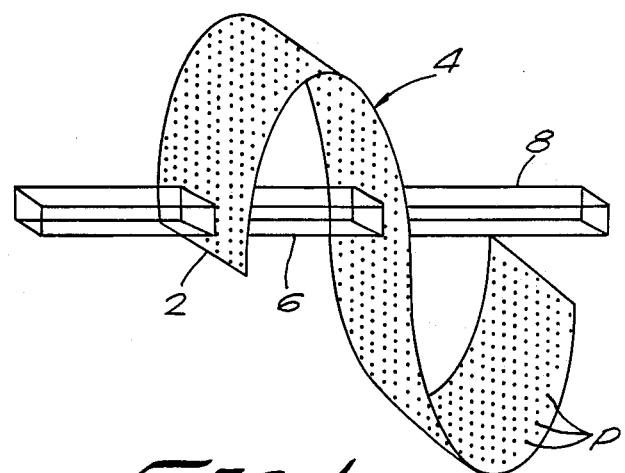
FIG. 1 is a perspective graphic representation illustrative of certain aspects of the system of the present invention.

FIG. 1 illustrates the hidden surface problem. Specifically, note how the end 2 of a ribbon 4 obscures a portion of the central section 6 of a rail 8. Accordingly, the obscured surfaces of the rail 8 must be deleted from the image both in the interests of clarity and realism. Generally, in accordance herewith, the points P in the figure are identified and sorted on the basis of x and y coordinates then selectively processed into a register on the basis of z axis position.

In FIG. 1, note that the end 2 of the ribbon 4 obscures part of the rail central section 6. Accordingly, portions of the rail section 6 behind the ribbon end 2 with reference to the viewer are dismissed. In FIG. 1, note that the rear surfaces of the rail 8 (as depicted) are displayed. Thus, the hidden line problem is illustrated. The points P (FIG. 2) are illustrated on the ribbon, but not on the rail 8.

In accordance herewith, points P on surfaces nearest to the viewer are registered in a bin using x and y coordinate selectivity. With the display data so organized or "binned", the normal for the specified surfaces is simplified. As indicated above, the normals are required for determining illumination effects if a surface is to indicate shading. This subject is treated comprehensively in a book, Principles of Interactive Computer Graphics, Newman & Sproull, McGraw-Hill, New York, 1979 (see section beginning at page 322).

Figure 2:
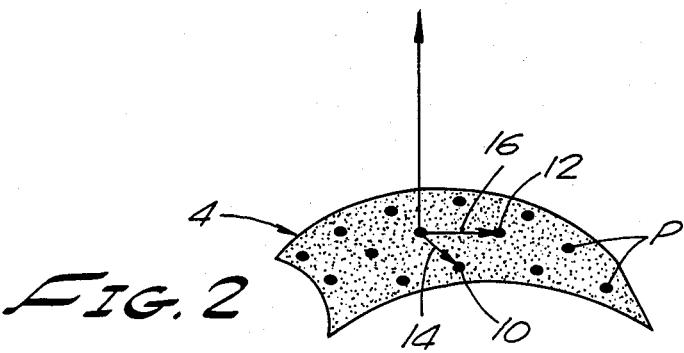
FIG. 2 is a fragmentary view of FIG. 1 illustrating a related calculation step of the system.

In accordance herewith, the normal at each point is estimated. As indicated above and illustrated in FIG. 2, vectors are formed from a point P to neighboring points P and an approximation of the normal is computed from the cross product. Neighboring points can be arbitrarily selected as long as the derived vectors are not co-linear as indicated above. As a specific example, FIG. 2 illustrates using neighbor points 10 and 12, below and to the right respectively for the vectors 14 and 16. Such selection will leave the last row and the last column undone, since they have no neighbors to the right or below. If such a limitation is significant, alternate neighbors could be found, left and top for instance. However, most pictures can forbear the limitation.

With the calculation of the normals and given a light source, any of several illumination techniques well known in the computer graphics art can be employed to assign intensities. Hence the visualization of the image is complete.

As an alternative to storing the specific coordinate x and y values for a point P, consideration has been given to saving just the z value for each bin, then discarding x and y. This saves considerably on storage, but produces Moire effects. A compromise is to store a truncated version x and y.

The variation is storing (x,y,z), the screen space coordinates, in each bin. The result of this is a distortion of the resulting normal if the viewing transformations include perspective. However, with mild perspective this technique can be totally acceptable. It has the advantage of allowing a faster surface scan to be performed in screen space, whenever possible.

With regard to operating speed, the operating time of the algorithm can be expressed as:

$$T = K*A/s2 + C/d2$$

where,
T = time
K = constant depending on the surface function
A = surface area scanned
s = resolution at which the surface is scanned
C = constant depending on the illumination function
d = display resolution.

Note that s is directly dependent on d, and the inverse of the square of d determines the number of pixels used for display; therefore the time is linear with respect to surface area scanned and to number of pixels used.

In using the system of the present invention, certain concerns merit consideration. Specifically, these concerns are treated in detail in the following material.

1. Wasteful oversampling might occur in order to saturate the z-buffer in the binning process.

2. Both position and normal are typically approximations to the actual value which should be displayed for each pixel.

3. If an edge passes between neighboring bins then the subsequent normal calculation can be totally spurious with respect to the surfaces on either side of the edge.

It is a subtlety of the algorithm that such considerations have a negligible effect on the method's efficacy. The first two concerns are addressed immediately below. The third concern is considered later in the discussion on edge enhancing.

The question of wastefulness must be weighed against the cost of traditional techniques and with consideration given to the application. In the case of planar surfaces it is straightforward to construct a surface scan which corresponds in a one-to-one fashion to the z-buffer without any oversampling. This is often done in scan conversion algorithms for polygons. In that regard, see the above-referenced book, Principles of Interactive Computer Graphics. Typical faceting methods perform combinatorial sorts on the number of facets. This is more efficient where the number of facets to be rendered is small. Exhaustive sampling must scan the entire surface of the object irrespective of the number of facets. A few large cubes would incur nearly the same expense as thousands of small cubes with the same surface area. It suggests that scenes with many small planar pieces are better done by the exhaustive sampling method while scenes with fewer large polygons are better done by traditional techniques.

The previous discussion provides one way of approaching the difficult task of comparing exhaustive sampling techniques to rendering schemes for non-planar surfaces. One of the most common ways to render curved surfaces has been to approximate the surface with planar pieces. A good approximation in areas of moderate to high curvature implies very many facets with small surface area, and thus the advantage of exhaustive sampling.

Another method for rendering surfaces is obtained by ray-casting. This requires finding a ray along the line of sight through each pixel. The ray is then inverted through the viewing transformations into object space and intersected with the surface. The intersection problem reduces to a problem of solving for roots of an equation. The closest root to the viewer is the one kept for the visualization. If a function is complicated to sample then the intersection process tends to be commensurately more difficult to perform, just as solving for roots of high order equations is considerably more involved than solving for roots of low order equations.

The ray-casting technique assumes surfaces for which roots of the resulting equations can be found, e.g., algebraic surfaces. There are cases for which faceting and ray solving methods are inadequate, the most obvious being non-analytic surfaces such as an annular structure of widely varying radius as the so-called "Norton's fractional surface".

With respect to the second concern (as expressed above) high resolution, i.e. smaller bins (pixels) increases accuracy. The position is not a significant factor since the result that is perceived at a pixel is the intensity due to the normal. The x, y and z components are retained for each pixel in order to compute the normal accurately. In the case of a planar surface this normal is exact; both vectors formed from neighboring points must be in the plane and therefore the cross-product of these vectors is the normal of the plane.

On the other hand, if the surface cannot be reasonably approximated in a linear fashion at the pixel with the given resolution then the image will suffer from aliasing problems regardless of the visualization technique used. Surfaces with high curvature compared to pixel resolution have unreliable surface normals in the sense that neighboring pixel normals have no relation to each other. A small movement in the surface will result in an entirely different pattern for the normals. This problem exists for any method which uses the surface normal and is addressed by any standard anti-aliasing routine as in the referenced book, Principles of Interactive Computer Graphics.

In the above timing expression, the first term predominates; most of the cost is in scanning the surface. Computing normals and intensities requires on average less than ten percent of the computation time. This fact provides another strong argument for using the approximated normal. The true normal for each point is likely to be much more expensive to compute than its first order approximation.

Finally, the use of the approximated normal is in keeping with the philosophy of rendering very general surfaces. Many functions do not allow easy calculation of the normal. Norton's fractional surface is entirely non-differentiable; a fact which, surprisingly, does not keep it from being rendered.

Consider the various types of surfaces that may be encountered in practicing the system hereof. In that regard, the distinctive traits of the exhaustive sampling method are the simple normal approximation direct surface rendering without inversion. The process is always directed from the space of surface definition to screen space. There are advantages to be won from such a method. The first is in the generality of surface type which can be displayed.

Consider parametric surfaces. A parametric surface in three dimensions is obtained from a system of three equations and five unknowns. Three of the unknowns are represented by the x, y and z coordinates of a point on the surface. The other two are referred to as the parameters, thus $x=x(u,v)$, $y=y(u,v)$ and $z=z(u,v)$ define the surface. This type of surface as may be defined by a toroidal knot, a Bezier patch, combined toroidal knots and the like, is especially well suited for scanning.

In parametric form it is a straightforward operation to measure the distance between $(x,y,z)$ and $(x+dx, y+dy, z+dz)$ resulting from a change of u and v to $u+du$ and $v+dv$. From such a measurement the maximum increment in u and v is computed to ensure that the binning process in x, y and z is exhaustive. The limiting conditions on u and v are also supplied by the user. The parameters u and v are allowed to increment between the given limits thereby saturating the z-buffer.

A very important parametric surface is the parametric polynomial surface as present in the so-called "bicubic Bezier patch". Surfaces composed of such patches are used extensively in computer-aided geometric design. Different methods for displaying polynomial patches have been surveyed. Exhaustive sampling is an alternative method.

Parametric polynomials have especially well behaved parameters when compared to other parametric surfaces; they are polynomial. This fact makes the scanning of such a surface easy to control and optimize. As an example, one optimizing technique is to use the coherence between parameter step size and the corresponding distance between samples on the surface. Occasionally the distance is tested and if the current scan is more than adequate then the parameter step size is increased. If the distance is becoming too large to fill all possible bins then the parameter step is reduced. The coherence between parameter and surface seldom require any section to be resampled.

Since surface area is the main factor in the speed of the algorithm, the expense of creating arbitrarily many patches is the same as doing a single patch of equal surface area. The cost of computing silhouettes, combinations and/or surface occlusions is the same for one patch or two dozen patches of equivalent area.

Consider now application to various implicit surfaces. A molecule figure was defined implicitly as a function of equipotential, similar to Blinn's "blobby atoms". The algorithm was seeded by scanning spheres close to the potential surface and relaxing the sample points onto the surface.

As with the parametric surface the area scanned is the primary factor in the speed of the rendering. Thus, many small molecules could be rendered for the same cost as one large one. The only limits to the kind of surface which can be displayed are those imposed by the sampling process and the surface normal appoximation. A topic of equal importance to what is rendered is the topic of how the surface is rendered. There are several reasons for needing different display modes. Some of them are:

1. Available equipment—computers, plotters, raster devices, etc.
2. Artistic needs—highlighting, shadows, texturing, etc.
3. User patience—fast and dirty vs. slow and pretty.
4 Viewing insights—transparency, cut away views, etc.

In the following sections different methods are suggested for adapting the exhaustive sampling technique to a variety of rendering environments.

In a very simple extension of the algorithm, one z-buffer was created and saved on disk. A subsequent z-buffer was then created. The first z-buffer was reloaded and compared pixel by pixel against the second for nearest z. Only the sample points with nearest z were retained in the most current z-buffer. The resulting image resolved all hidden surfaces between the two previous buffers. This technique of uniting two buffers could be continued indefinitely by saving away subsequent results and comparing them with new buffers. The total computation time would be somewhat less than the sum of the times for each image. This is because the surface normal computation need only be calculated once after all desired unions have been performed.

Consider clipping operations. Given an object which divides space into two mutually exclusive parts it is possible to perform visual "subtractions" on images. Implicit functions have the form $F(x,y,z)=0$. This divides the world into points which satisfy $F(x,y,z)=0$ or points which satisfy $F(x,y,z)>0$. The object defined by an implicit function may be thought of as a window into the image. It requires the implicit function to be evaluated for each sample point during the scan. Any sample point which tests out on the "false" side of the object is discarded as a candidate for the z-buffer. This leaves a hole in its image through which the "true" part may be seen.

Clipping can be defined by any of various well known methods which define an object which divides space. The viewing frustum defined by the viewpoint and screen is one example.

Another aspect involves edge enhancing. The viewability of an object can often be heightened by emphasizing edges and profiles. The technique for approximating the surface normal assumes continuity of the surface. In fact, it assumes that the surface is nearly planar in the neighborhood of a sample point. If the surface as projected to screen space is discontinuous or kinked, then the approximate normal is unlikely to represent the true normal for any sample point. In general it will be quite different, resulting in an intensity which contrasts to the intensities of neighboring points. In this manner edges, profiles and angularities are emphasized. In general the result is good, so it is called a feature.

If it is unacceptable for any given application, as with various light source positions, there exists another variation which trades off this "edging" for memory. It requires calculating and storing the actual normal with each pixel.

Consider rendering shadows in an image as another way to heighten the perception of a surface. The task of determining what part of an image lies in the shade is similar to resolving hidden surfaces with respect to a viewer located at the light source.

Exhaustive sampling can be applied to this problem in the following manner. Two z-buffers are calculated from the given object. The first is the standard z-buffer with respect to the viewer. The second z-buffer assumes the viewer is located at the light source. The points of the second buffer are then rotated so that the viewer-axis points to the light source. A point in the first buffer is considered in the shade of the light source if it is not close to any point of the other buffer. Its intensity is modified accordingly.

Figure 3:
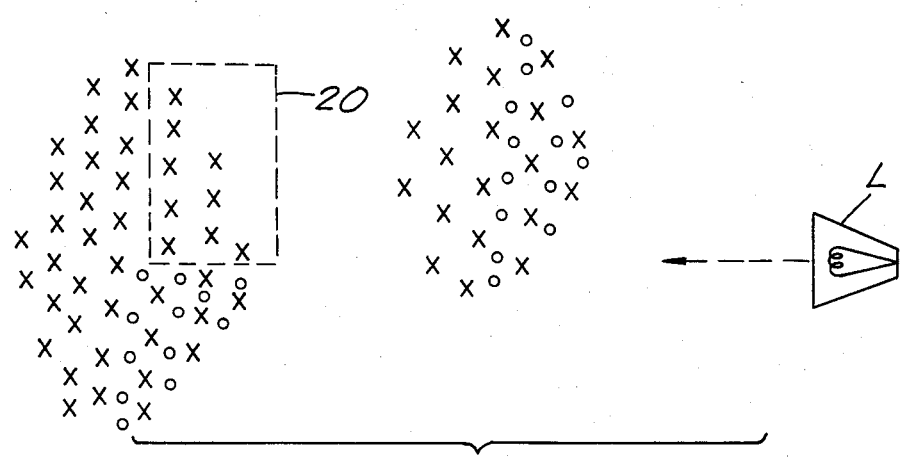
FIG. 3 is a diagram illustrative of shadowing in accordance with the system of the present invention.

The technique is illustrated in FIG. 3. In the drawing, x's represent points in the first buffer; and o's are points from the second buffer after rotation. The light source is represented at L. Many of the x's would be shadowed because their normal approximations point away from the light source. The x's in the marked region of a dashed line block 20 are shadowed because they are not close to any of the o's.

There are several ways that "nearness" between points in the two z-buffers can be resolved. A search through all possible cases for each point is clearly the worst method. A circular object with considerable dimension was shadowed by using the second buffer to saturate the first, that is, each rotated point of the second buffer was sorted into the first z-buffer and first and second points compared. If the two points were both within a given distance, then the first point was marked as normal. Any points of the first buffer not marked were considered to be in a shadow.

In order for this comparison of the two buffers to work, the second one must be sampled with greater density than the first, else the subsequent comparison of the first to the second might be undersampled. To understand this one need only consider how easy it is to rotate the vertices of a cube so that none of them lie in the cube. If the vertices are transformed into new points, closer to the center of the cube, then the chances of rotating the new points out of the cube become slimmer. At a scale factor of less than 1/SQRT(3) the chances are nil.

The time to create a picture with shadows using the described technique is four times what the image without shadows would cost. This follows since the second z-buffer takes three times (SQRT(3) squared) as long to produce as the first buffer. Additional light sources could be computed by repeated use of the second buffer and appropriate marking.

The operation could be optimized by choosing the scale factor based on the rotation of the second buffer.

Next consider the techniques hereof in relation to image texturing. A texture pattern on a surface is achieved by modulating the normally occurring intensity values by some function which has the surface as its domain.

Using a so-called "Bezier patch", a set of constant grid lines in parameter space was mapped onto the surface. This was accomplished during sampling by checking whether a sample point in terms of u and v were close to a grid line. If so, the resulting sample point in the z-buffer was marked. During the intensity calculation the marked points were assigned dark values.

Any pattern in parameter space could be mapped to the surface in a similar fashion. Grid lines or other geometric objects mapped on the surface can be an aid to visualizing the surface. In other applications, patterns in parameter space can be "stretched" onto the surface for aesthetic reasons.

A different type of texture algorithm was applied to produce another form of image. The probability of being marked for intensity modification varied with respect to the angle between viewer and surface normal. A smaller angle increased the likelihood that the intensity was modified. The parts of the surface which were most nearly perpendicular to the viewer were the ones most susceptible to the texture "fungus". The image gave the impression that the texture was blown at the surface from the direction of the viewer. It possessed a perceptible regularity because of the way the probability was computed. It is well known that many random number generators exhibit patterns in two dimensions. These patterns are indicated in the fungus texture as well, but they seem to add to the malaise effect so no attempt was made to change it.

As indicated above, hidden line elimination has been a substantial and enduring problem. A paucity of literature describes hidden-line techniques for general surfaces. Exhaustive sampling in accordance herewith can be applied to this problem as follows.

It is assumed that some method exists for rendering lines on the object to be visualized. The lines may be contours derived from intersecting the surface with a family of parallel planes, or lines of constant parameter value for parametric surfaces. The first step of the algorithm for hidden-lines is to partition the given lines into line segments, the maximum length of which is somewhat less than the grid size of the z-buffer. This is generally a trivial step since most plotting routines are incremental; small line segments are the standard and the technique is well known for accomplishing them.

The next step is to create a z-buffer of sample points in exactly the same manner as is done for a shaded picture using exhaustive sampling.

The final step is to compare the endpoints of each line segment by sorting the endpoints into the z-buffer and deciding whether the corresponding z value of the endpoint is sufficiently close to the z-value of the buffer. If either endpoint is too far from the z-value then the line segment is considered hidden by the surface and the line segment is eliminated from display. All other segments are plotted.

The hidden line/surface problem will now be considered with regard to an illustrative implementation and reference now will be made to FIG. 4 for consideration of the dissection of surfaces.

As illustrated, a truncated pyramidal volume V is represented to indicate a field of vision for a viewer represented by an eye E and located at a viewpoint. Generally, a graphic display is provided by representing objects that lie in various positional relationships within the volume V so as to provide a composite two-dimensional display on a screen represented by a surface S. The objects are represented by data which define surfaces, and the data is processed, as for example, to determine those surfaces and portions of surfaces which are obscured and should be eliminated. As illustrated (FIG. 1) a rail 8 pierces a ribbon 4. A fragment of the representation is shown in the volume V, specifically at the location of an intersection where the hidden surfaces are manifest. The data definitive of such an arrangement might be variously formatted in coordinates x, y and z as indicated. Processing the data to provide an effective presentation involves eliminating portions of the rail 8 obscured by the ribbon 4, and portions of the ribbon 4 obscured by the rail, both with regard to favoring those surfaces closest to the eye E. In view of the above description of processes in accordance with the present invention, it can be seen that the basic operation involves eliminating all object points at a specific x,y coordinate in the plane of the surface S, except the point that is nearest to the eye E. Of course, in processing the data, the screen surface S may be a virtual surface, as existing in storage. Accordingly, the z dimension is the criterion for selecting a single object point P (FIG. 2) at each x,y location. That selection in accordance herewith resolves the hidden line/surface problem.

In accordance with various techniques well known in the art of computer graphics, objects can be represented as by defined points in x,y,z coordinates. Such data is commonly registered and manipulated in terms of electrical signals. Well known techniques are employed to organize scenes from object data and accomplish desired motion patterns. With regard to such techniques, the system of the present invention involves exhaustive data sampling at the surface S (FIG. 4) to selectively render the desired surface points, eliminating hidden lines or surfaces, uniting images, clipping, enhancing edges, casting shadows and texturing.

Figure 4:
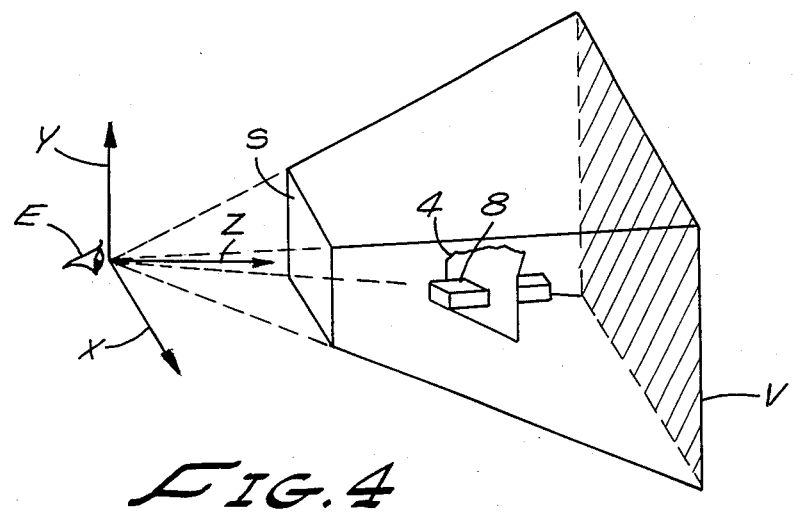
FIG. 4 is a graphic representation illustrative of the process of the present invention.

Recapitulating to some extent, consider the system of the present invention with reference to the screen surface S of FIG. 4. Essentially, the surface S is resolved into x and y coordinates with defined locations for mapping the image points that will compose a scene. Figuratively, each point is mapped onto the screen surface S. For each defined location, the point with the largest value in the z dimension (nearest the viewer E) is retained. Points at the defined location that are more remote from the viewer E are abandoned as hidden.

Essentially, the steps involve: defining a dense set of locations on the surface S, mapping each image point with respect to the defined locations and sorting the points for registration accordingly, then selectively saving in storage the data of a point which is closest to the viewer.

Figure 5:
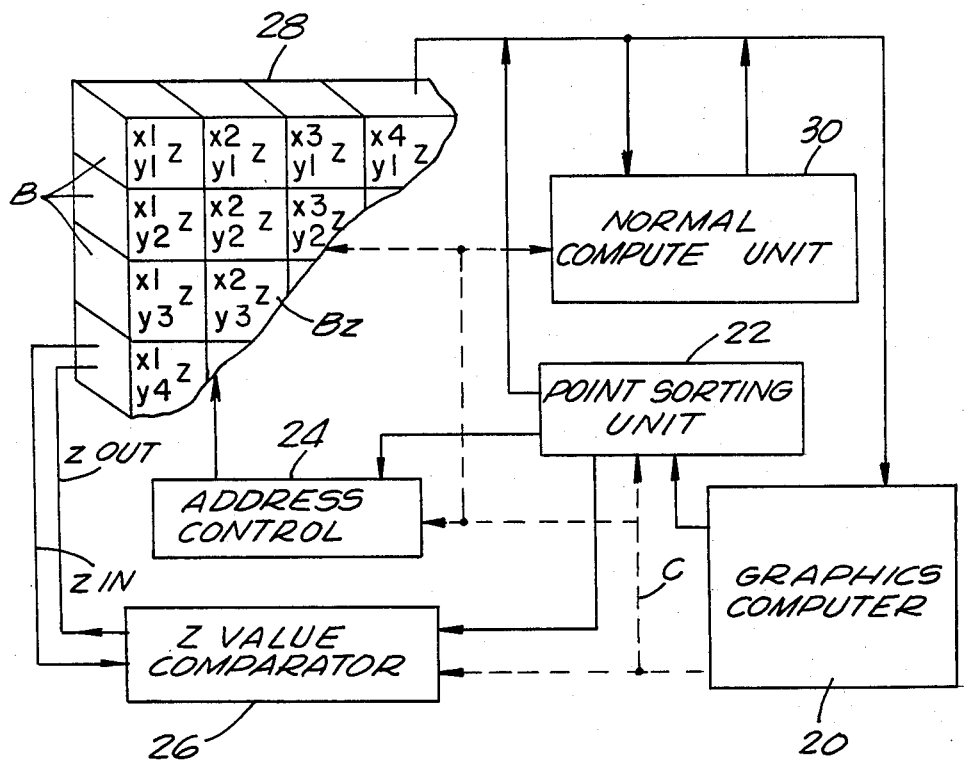
FIG. 5 is a block diagram of a system in accordance with the present invention.

To consider an embodiment in accordance with the present invention, reference will now be had to FIG. 5. A graphics computer 20 (lower right) is a well known apparatus for developing pictures from computer data. The computer 20 provides a long sequence of signals representative of points defining objects for an image. The points are manifest in terms of coordinate values x, y and z.

The graphics computer 20 supplies object point data to a point sorting unit 22 which may re-arrange the order of the point data for more expedient processing.

Signals representative of point data are provided from the sorting unit 22 to an address control 24 and a z value comparator 26. Specifically, for each point relating to an object, the address control receives x and y values mapping the point on the screen S (FIG. 4). Concurrently, the z value for the point is provided to the z value comparator 26.

The address control 24 operates in association with a register 28 which may be considered as including a substantial number of bins B, each for storing data on a specific point. For purposes of illustration, the register bins B are designated as a rectangular coordinate array. For example, the bin at the upper left corner as illustrated is designated x1,y1 and will store the upper left point data in relation to screen space, e.g pixels of the screen S of FIG. 1.

The register 28 is connected to the address control 24 for the designation of a specific bin. Connections from the register 28 to the comparator 26 supply z values of designated object points falling within the bin (e.g. for bin x1,y1, point sub-values x1a, y1a and so on) to the comparator 26 for comparison with fresh values of the same dimension, normally from another object. The z value received by the comparator 26 which is indicated to be nearest the viewer E (FIG. 4) is returned to the register 28.

Output signals from the register 28 are supplied directly to the graphics computer 20 and indirectly through a normal compute unit 30. The unit 30 simply has the computing capability to compute normals as explained above.

In the operation of the system of FIG. 5, each point is mapped into screen space and sorted for an appropriate bin B in the point sorting unit 22. In sequence, the x and y values for points are supplied to the address control 24 to specify a bin B. For example, assume that a point with coordinates x2, y3 and z4 is under consideration. In that instance, from the address control 24, the values x2 and y3 specify the storage bin Bz. Consequently, the z value in the bin Bz (z2) is supplied to the z value comparator 26. Concurrently, the value z4 is supplied to the comparator 26 from the unit 22. A value comparison by the unit 22 determines that the value z4 is greater than the value z2. Consequently, the value z4 is registered in the bin Bz, the value z2 being abandoned. At the same time, the precise values of x2 and y3 are also registered in the bin Bz. In that fashion, object points are processed until the register 28 stores the z value points that are nearest to the viewer; accordingly, hidden surfaces are eliminated.

Note that the computer 20 has control lines coupled to each of the other component structures as indicated by the dashed control lines C. Upon completion of the binning process, the computer 20 commands the second phase of operation which involves computing the normals. That operation is commanded by activating the normal computer unit 30.

As explained in detail above, vectors from each point to neighboring points are formed then an approximation of each normal is computed from the vectors' cross product. For example, a vector would be formed by the points (x2,y2,z) and (x3,y2,z); see FIG. 2. The unit 30 would then compute the approximation of the normal supplying that data to the computer 20 for use in developing the desired picture.

From the above, the scope and generality of the techniques described will be apparent. Exhaustive sampling offers a variety of imaging techniques for direct surface rendering of very general surfaces. Note that exhaustive sampling differs fundamentally from other z-buffer methods in that it employs a surface scan to fill the buffer instead of solving for intersections of a ray with the surfaces of the objects. The estimation of the surface normal by comparison to neighbors also distinguishes conventional techniques. In contrast to conventional rendering methods, the speed of exhaustive sampling does not depend on the number of objects involved, but on the total surface area sampled. Many small objects are rendered in the same time as one large object of equivalent surface area. The system also is very compact generally in relation to prior hidden-line techniques.

The variations described are indicative of the different techniques which can be derived from exhaustive sampling. They are hardly comprehensive. One can imagine planar reflections from appropriate transformations, clippings and unions of z-buffers, for example. Accordingly, the scope hereof should not be limited to the specific disclosure herein but rather determined by the claims.

What is claimed is:

1. A computer graphics system for processing data representative of objects as to provide an image to a viewer, comprising:
    means providing a coordinate array register;
    means for providing said data as coordinate signals representative to points to exhaust the display surface and with greater resolution than said coordinate array register, said points being defined on said objects in viewing screen coordinates; and
    means for testing said coordinate signals for registration in said coordinate array register whereby to selectively register signals for viewing screen coordinates nearest to said viewing screen as to eliminate hidden components to the image.

2. A computer graphics system according to claim 1 further including means to define vectors from points recistered in said coordinate array register to selected adjacent points so registered and thereby computing approximations to the surface normals from such vectors.

3. A computer graphics system according to claim 1 wherein said coordinate signals manifest specific x,y and z coordinate sub-values within said coordinate array register.

4. A computer graphics system according to claim 3 wherein said means for testing comprises means for comparing z values of coordinate signals within a specific range of values for x and y as defined by said coordinate array register.

5. A computer graphics system according to claim 4 wherein said means for providing a coordinate array register comprises a register means addressed with reference to x and y coordinate values.

6. A computer graphics process for selectively screening display data representative of objects, comprising the steps of:

defining sets of points representative of said objects;

mapping said points into viewing screen coordinates; and testing said points with reference to a predetermined plane whereby to select image points within specific pixel coordinates for display to accomplish a predetermined display viewpoint.

7. A process according to claim 6 wherein said predetermined plane comprises said viewing screen for said predetermined display viewpoint.

8. A process according to claim 6 further including the steps of: defining vectors from said selected image points to selected adjacent image points and computing approximations to the surface normals from said vectors.

9. A process according to claim 8 wherein said selected adjacent image points are below and to the right of said points.

10. A process according to claim 6 further including the step of registering said selected image points.

11. A process according to claim 7 further including the steps of registering a second set of said selected image points, and further, comparing said sets of image points for selection with reference to the viewing axis dimension.

* * * * *

UNITED STATES PATENT AND TRADEMARK OFFICE
CERTIFICATE OF CORRECTION

PATENT NO. : 4,625,289

DATED : November 25, 1986

INVENTOR(S) : Alyn P. Rockwood

It is certified that error appears in the above-identified patent and that said Letters Patent is hereby corrected as shown below:

| Column | Line | |
|---|---|---|
| 7 | 45 | after "4" should be a period. |
| 11 | 41 | after "same" should be --bin--. |
| 11 | 41 | after "dimension" "normally" should be deleted and --as-- should be inserted. |
| 11 | 55 | "with" should be --within--. |
| 12 | 47 | before "points" should be --of-- instead of "to". |
| 12 | 55 | "to" should be --of--. |
| 12 | 58 | "recistered" should be --registered--. |

Signed and Sealed this

Twenty-eighth Day of April, 1987

Attest:

DONALD J. QUIGG

Attesting Officer

Commissioner of Patents and Trademarks